June 30, 1936.  J. WASHINGTON  2,046,046
GROUND WORKING MACHINE
Filed May 17, 1935   2 Sheets-Sheet 2
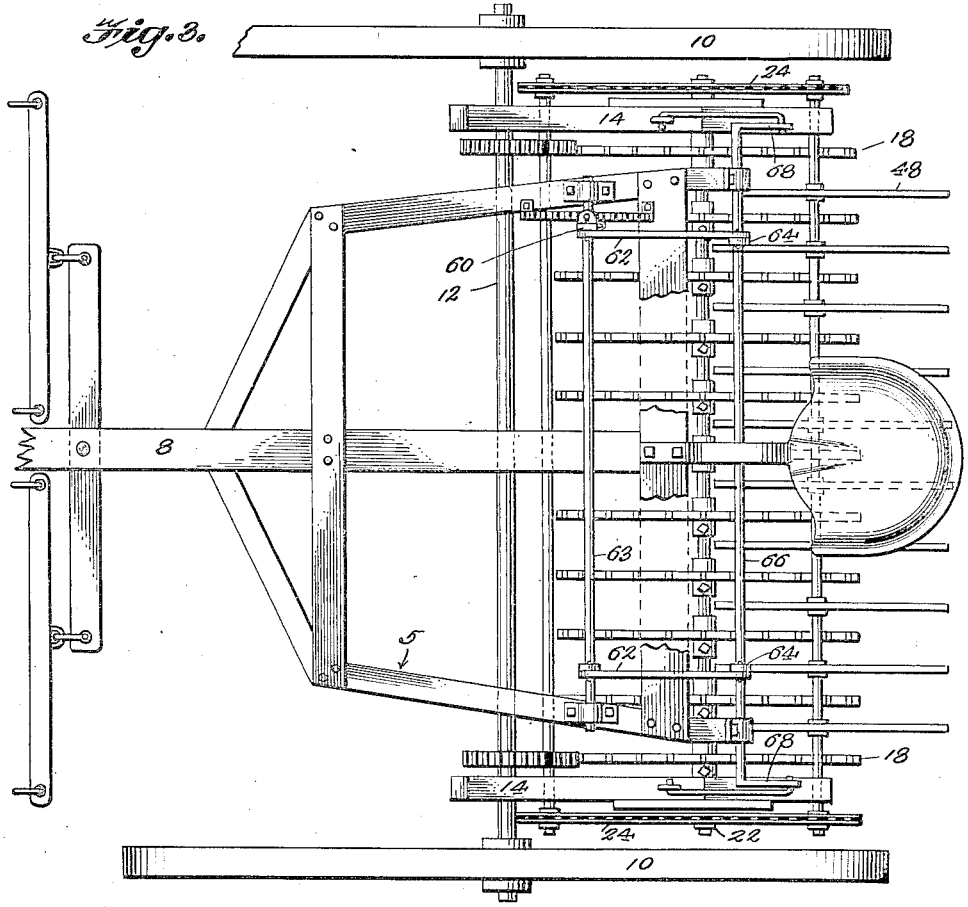
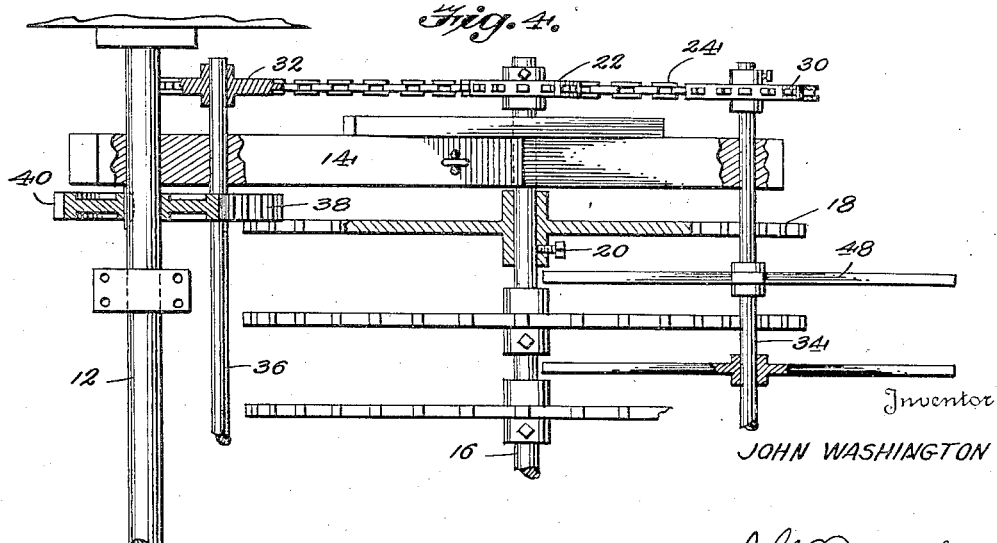
Inventor
JOHN WASHINGTON Patented June 30, 1936

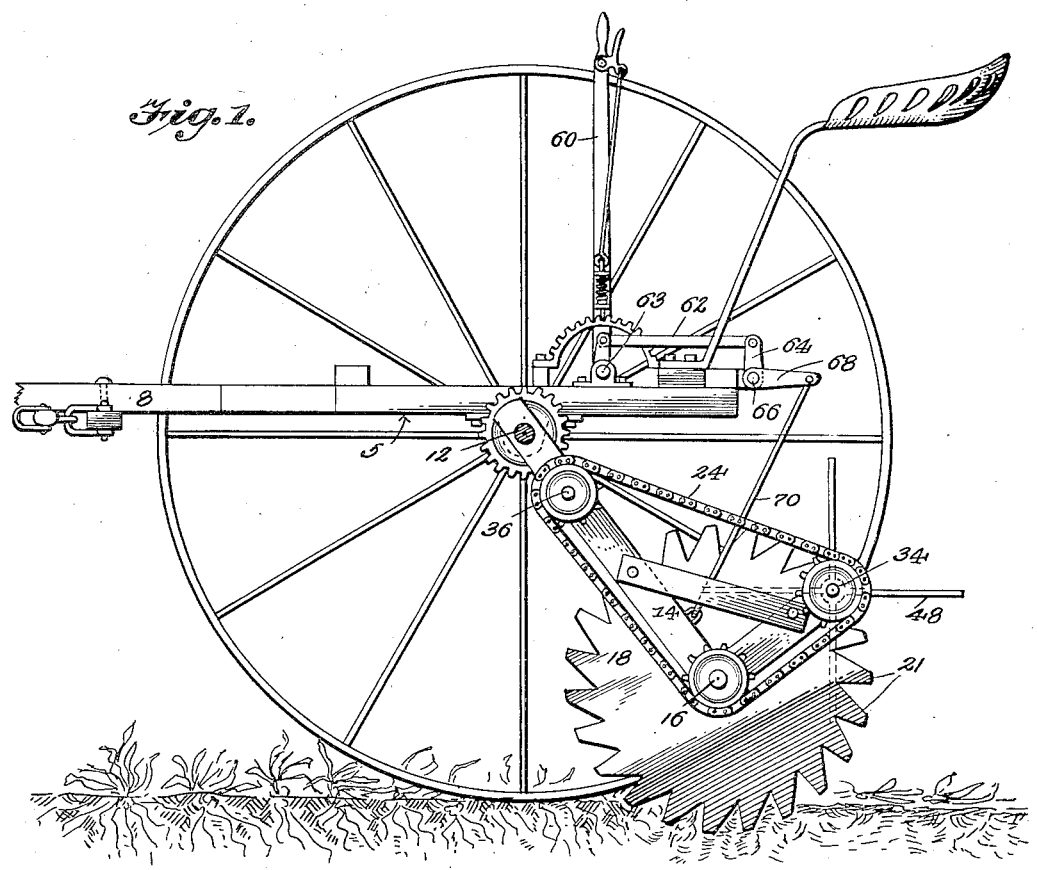
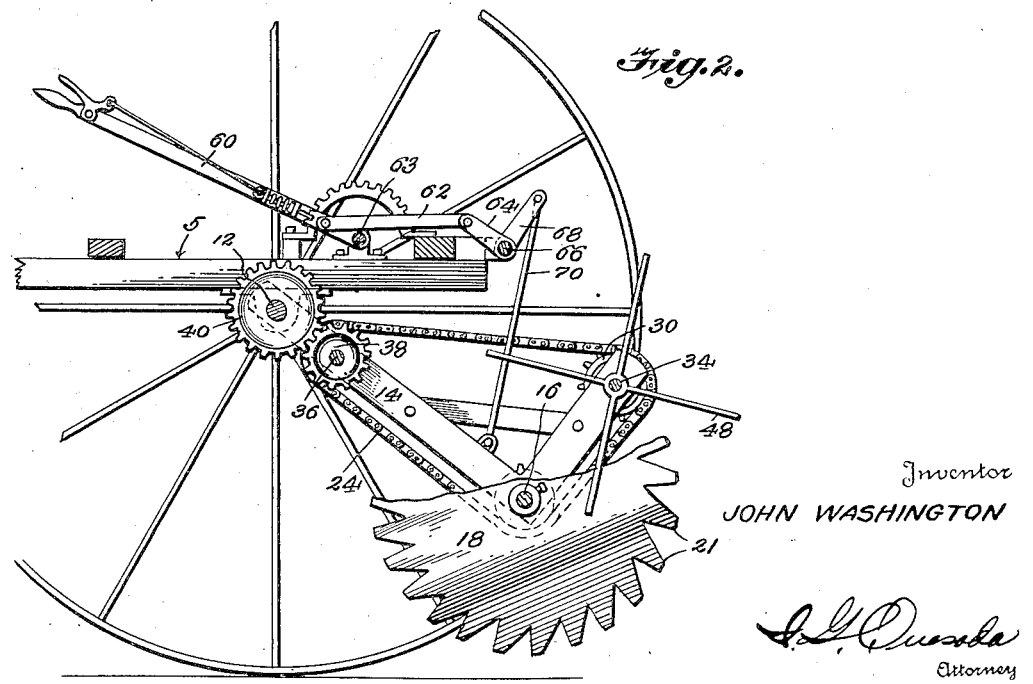

2,046,046

UNITED STATES PATENT OFFICE 2,046,046

GROUND WORKING MACHINE

John Washington, Waco, Tex.

Application May 17, 1935, Serial No. 22,074

2 Claims. (Cl. 97—40)

This invention relates to a ground working machine and will be found to be especially useful in the eradication of Johnson grass and other noxious weeds.

One of the objects of this invention is to provide a machine having simple and easily acting means for pulverizing the ground being worked and leaving on the surface all Johnson grass roots, weeds and the like.

The invention also looks to a machine of the character suggested which, by reason of the ground engaging elements thereof, will work through the ground to pulverize the same as distinguished from pushing the ground ahead of the ground working element.

In addition, an attribute of the invention resides in the fact that the ground working elements, which are shown to be in the nature of toothed disks, have associated therewith simple means by which grass and the like is removed from the disks so as to prevent congestion at this point.

Another object of the invention is to provide a ground working machine of the character specified, which is of highly simplified construction, rugged and simple to operate.

Other objects and advantages will be apparent during the course of the following description.

In the accompanying drawings, forming a part of this application, and in which like numerals are employed to designate like parts throughout the same, Figure 1 is a fragmentary side elevation of the improved machine, the ground working means being in operative position, Figure 2 is a similar view of the ground working means in raised or inoperative position, Figure 3 is a fragmentary plan view of the machine, Figure 4 is an enlarged fragmentary horizontal sectional view through the machine.

In the drawings, wherein for the purpose of illustration is shown a preferred embodiment of the invention, the numeral 5 generally designates a frame having a tongue 8 provided with suitable draft means for the connection of draft animals or a tractor, this being immaterial.

From Figure 3, it will be seen that a pair of main supporting wheels 10 are located at opposite sides of the frame and are mounted upon an axle 12 which, in turn, is carried by the frame.

The support for the ground working means will be found to embody a pair of L-shaped members 14, located inward of the wheels 10 in suitably spaced relation thereto, and having upwardly and forwardly directed legs rockably mounted upon the axle 12. That is to say, the members 14 which are of L-shaped form, are rockably mounted upon the axle 12 so as to allow the swinging movement of the ground working means from the operative position suggested in Figure 1 to the inoperative position disclosed in Figure 2.

The several L-shaped members 14 have connection at the bend or angle therein with a cross shaft 16 upon which there is mounted a plurality of ground working disks 18. More particularly, the disks 18 are formed with hubs secured to the cross shaft 16 by set screws 20 or other suitable fastening devices.

In practice, it is preferred that the several disks 18 be rather close together, possibly not more than three-and-one-half or four inches apart and by reference to Figure 2, it will be seen that the disks are provided with annular series of peripheral teeth 21 tapered toward the outer portions thereof and extending at acute angles to the radius of the disks. More specifically, the teeth of the disks are angled forwardly in the direction of travel of the machine for effective contact with the Johnson grass, weeds and other noxious growths encountered thereby.

By reference to Figures 2 and 4, it will be seen that the cross shaft 16 also has mounted thereon sprocket wheels 22 about which sprocket chains 24 are trained.

The sprocket chains 24, of which one is located at each end of the battery of disks, are also trained about sprocket wheels 30 and 32, the sprocket wheels 30 being carried by a shaft 34, while the sprocket wheels 32 are carried by a shaft 36. The shaft 34 is carried by the rearwardly and upwardly directed legs of the several L-shaped members 14 while the shaft 36 is carried by the forward portions of the forwardly directed legs of the several L-shaped members 14.

It is clearly illustrated in Figure 4 that the cross shaft 36 has a pair of gears 38 mounted thereon and engaged by complemental gears 40, keyed or otherwise secured upon the axle 12. It is believed to be clear that rotation of the axle 12 will result in turning of the cross shaft 36 and in the rotation of the shaft 16 in a clockwise direction.

This, of course, turns the battery of ground working disks 18 in a clockwise direction with the teeth thereof moving against the ground in the direction of travel of the machine.

It is important to observe that the gears 38 have approximately one-half the number of teeth possessed by the gears 40 and this ratio results in the turning of the disks 18 at a speed substantially faster than the travel of the machine. Thus, the disks are enabled to work through the ground for effective pulverizing contact therewith as distinguished from merely pushing ahead of them the dirt encountered thereby, as would be the case were the disks driven at a slow speed. However, the speed of the disks is not sufficient to throw the dirt encountered thereby a substantial distance above the ground or to in any way interfere with the most efficient use of the machine.

Now, by reference to Figures 2, 3 and 4, it will be seen that the shaft 34 carries a plurality of cleaning elements 48 embodying radial tines movable between the disks 18 so as to maintain the same free of accumulations of grass and the like. The cleaning devices 48 are shown to be located at the rear sides of the several disks in definitely overlapping relation thereto and to be turned in a clockwise direction. This arrangement removes from the disks and the spaces between the disks accumulations of grass and the like and deposits the same rearwardly of the entire machine.

As previously stated, the cross shaft 34 is provided with the sprocket wheels 30 and such sprocket wheels are engaged by the chains 24 and this provides for the rotation of the cleaning devices along with the ground engaging disks.

The ground engaging disks may be swung from one extreme position to another through the operation of a hand lever 60 fulcrumed on the frame and having connection with a pair of rearwardly directed links 62 through the medium of a cross shaft 63. The links 62 are, in turn, connected to cranks 64 keyed or otherwise secured upon a cross shaft 66. It is shown in Figures 1 and 3 that the cross shaft 66 has connection with a pair of spaced cranks 68 and said cranks have operative connection with depending links 70. The links 70 have pivotal connection with the L-shaped members 14 at points adjacent the angle therein and complete the chain of motion between such L-shaped members and the lever 60 so that operation of the lever provides for the raising or lowering of the disks to secure the same in the uppermost position or in the lowermost position, or in a number of intermediate positions. This, of course, provides for a variation in the penetrating depth of the disks.

With reference to the foregoing description, taken in connection with the accompanying drawings, it is believed to be clear that the progress of the machine along the ground will result in the rotation of the battery of ground working disks so that the teeth of said disks may have effective and destructive contact with the Johnson grass and other noxious growths encountered thereby, while at the same time, the ground is pulverized to the proper degree for effective cultivation of the soil.

To prepare the land for the operation of the machine featured herein, it is merely necessary to break the land in any preferred manner.

The machine will be seen to be of exceedingly rugged construction with the result that it is able to withstand the use and abuse to which machines of this character are known to be subjected, while by the same token, the highly simplified construction of the machine makes it exceedingly simple to operate and service.

Having thus described the invention, what is claimed is:—

1. In a machine of the character specified, a frame, a support pivotally carried by the frame, a shaft carried by the support, a plurality of disks keyed upon the shaft in spaced parallel relation and having straight peripheral teeth tapered toward the outer edges thereof to facilitate the removal of matter from beneath the teeth and extended angularly with respect to the radii of the disks for effective and destructive contact with the grass encountered thereby, a cleaning device embodying a plurality of tines movable between the disks to remove accumulations of grass and other matter from between the disks, and means for driving the cleaning device and the disks at the same speed, said tapered teeth being formed with ground engaging outer terminal portions having angular leading corners.

2. In a machine of the character specified, a frame, an axle carried by the frame, wheels having connection with the axle, gears mounted on the axle, a pair of L-shaped members mounted on said axle and having forwardly and rearwardly directed legs, a shaft carried by the forward legs of the L-shaped members, gears mounted upon said shaft and meshing with said first named gears, a pair of shafts carried by said L-shaped members, one of said shafts of the pairs of shafts being at the juncture of said legs and the other shaft of said pair of shafts being at the rear terminal portions of the rearwardly directed legs, sprocket wheels mounted on each of the shafts of said pairs of shafts, sprocket wheels mounted on the first named shaft, sprocket chains trained about said first and second named sprocket wheels for driving the same in unison, disks mounted on one of said shafts of said pair of shafts and having ground working means, cleaning devices mounted on the other shaft of said pair of shafts and movable between said disks, said gears being of different diameters to drive the disks at a rate of speed substantially faster than the travel of the machine.

JOHN WASHINGTON.